Sept. 16, 1969     J. R. REDDITT     3,467,418
JIFFY JACK SCAFFOLD BRACKET AND JOINT THEREWITH
Filed July 24, 1967
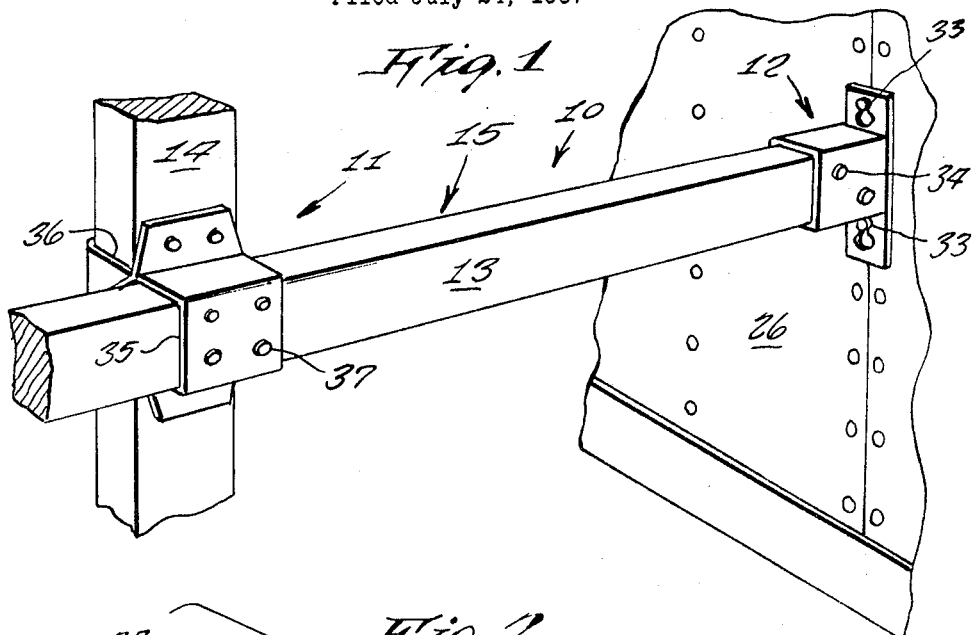
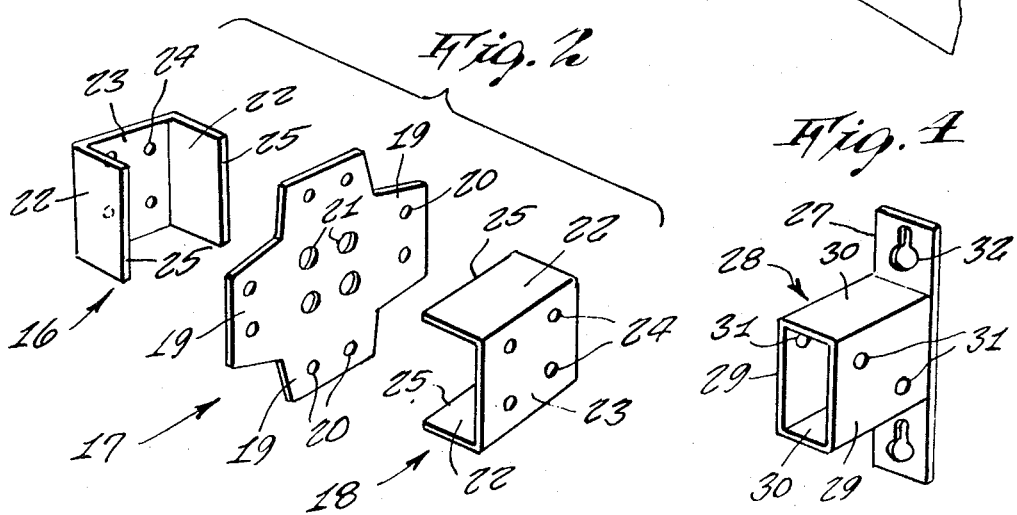
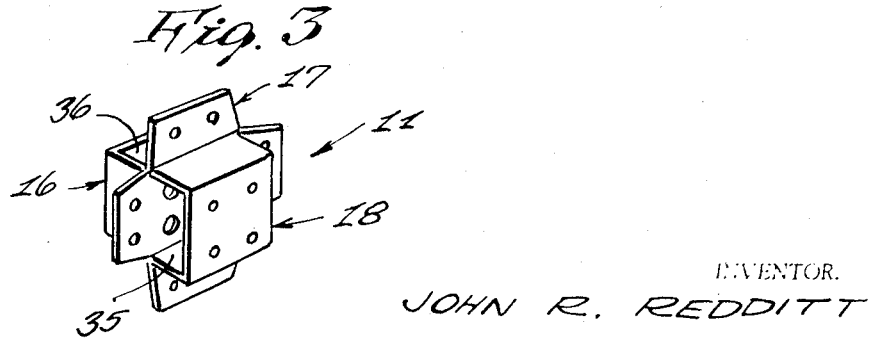
INVENTOR.
JOHN R. REDDITT

United States Patent Office

3,467,418
Patented Sept. 16, 1969

3,467,418
JIFFY JACK SCAFFOLD BRACKET AND JOINT THEREWITH
John R. Redditt, Brownhelm Station Road, Vermillion, Ohio 44089
Filed July 24, 1967, Ser. No. 655,388
Int. Cl. F16b 7/00, 5/00, 9/00; E04c 3/00
U.S. Cl. 287—20.92                5 Claims

ABSTRACT OF THE DISCLOSURE

A pair of brackets comprising a set which may be used in the erection of a scaffold, one of the brackets being used for securing the end of a horizontal beam to an existing wall or post, and the other of the brackets being used for interconnecting a horizontal beam with a vertical post.

---

A bracket set is provided for uniting a pair of wooden crossing members, the set comprising an interconnecting bracket and an end bracket with nail openings to secure the brackets to the wooden crossing members. The interconnecting bracket comprises two channel-shape sleeve members with their open sides facing each other and secured together through the means of an intermediate plate which has one or more tabs adapted to be nailed to one or both of the wooden crossing members. The clear openings through the two sleeve members permit each of the wooden crossing members to extend through its associated sleeve and beyond the other crossing member.

Another object of the present invention is to provide a jiffy jack scaffold bracket set comprised of a pair of brackets, one of the brackets being secured to a vertical surface for supporting an end of a horizontal beam and the other of the brackets being for the purpose of interconnecting a horizontal beam with a vertical post.

Yet another object of the present invention is to provide a jiffy jack scaffold bracket set which will permit instant attachment of beams and posts with a minimum effort and time.

Other objects of the present invention are to provide a jiffy jack scaffold bracket set which is simple in design, inexpensive to manufacture, rugged in construction, easy to use and efficient in operation.

These and other objects will be readily evident upon a study of the following specification and the accompanying drawing wherein:

FIGURE 1 is a perspective view of the present invention shown in operative use upon a scaffold construction;

FIGURE 2 is a perspective exploded view of the elements that comprise an inter-connecting bracket for a pair of scaffold members that cross each other;

FIGURE 3 is a perspective view thereof shown assembled; and

FIGURE 4 is a perspective view of an end bracket for supporting the end of a scaffold member.

Referring now to the drawing in detail, the reference numeral 10 represents a jiffy jack scaffold bracket set, according to the present invention, wherein there is an interconnecting bracket 11 and an end bracket 12.

The interconnecting bracket 11 comprises a member for connecting together a pair of crossing members of a scaffold. Thus as is shown in FIGURE 1 of the drawing, the bracket 11 is used for rigidly securing a horizontal beam 13 to a vertical post 14 of a scaffold construction 15. The interconnecting bracket, illustrated in operative use in FIGURE 1 and shown alone in FIGURE 3 is comprised of three separate elements 16, 17 and 18, made preferably from steel sheet, as shown in FIGURE 2 of the drawing, and which are welded together to show the final structure illustrated in FIGURE 3. Thus as is shown in FIGURE 2, a central plate 17 of flat character is shown to have four extending tabs 19, each of which is provided with a pair of openings 20. The plate is provided with a plurality of relatively larger central openings 21. The elements 16 and 18 comprise generally channel shaped members having parallel spaced apart side walls 22 and an interconnecting wall 23 therebetween which is provided with a plurality of openings 24. The edges 25 of the members 16 and 18 are welded to opposite sides of the plate 17 to form a rigid unitary structure, and wherein the channel of element 16 is at right angle to the channel of the element 18, as is shown in FIGURE 3. Thus the device may be used for receiving scaffold members running in perperpendicular directions. The channel members 16 and 18, when united with plate 17, provide two sleeves having through openings 35 and 36 rectangular in cross section.

The end bracket 12 which is shown in FIGURE 1 supporting the end of the beam 13 upon an upstanding wall 26 is comprised of a flat steel plate 27 and a generally rectangular sleeve 28 having parallelly opposite side walls 29 and parallel opposite end walls 30. Openings 31 are provided in the side walls 29 for purpose of receiving nails or the like so to secure the end of the beam 13 therewithin. The plate 27 is provided with a pair of slots 32 so as to receive nails 33 so as to secure the end bracket to the wall 26.

In operative use, the end bracket is secured to a wall 26 or other vertical surface, and the end of a beam 13 is inserted thereinto, after which the beam end is secured by means of nails 34 inserted through openings 31 and driven into the end of the beam, thus securing the beam therewithin. The other end of the beam 13 is fitted into an opening 35 formed by the member 18, and a vertical post 14 is inserted into an opening 36 formed by the member 16. When the post and beam are properly aligned for their correct respective position, nails 37 are driven into openings 24 in the members 16 and 18 thereby rigidly securing the beam and post relative to each other. The openings 21 in plate 17 are to permit nails 37 to enter post 14, if desired, and these openings are of a size to permit some inclination of nails 37 from a normal to wall 23 of channel member 18.

While various changes may be made in the detailed construction, it is understood that such changes will be within the spirit and scope of the present invention.

I claim:
1. A scaffold bracket comprising plate means providing two mutually contacting sleeves, each sleeve having a through opening rectangular in cross section to receive a scaffold member extending through each sleeve and extending beyond the other sleeve, means rigidly securing said sleeves together at said mutually contacting zone with said openings generally parallel to each other and extending at right angles to each other leaving said through openings clear, there being a wall of each sleeve opposite said mutually contacting zone, and there being openings through the walls of said sleeves permitting nails to be driven into said scaffold members in said sleeves.

2. A bracket as defined in claim 1, wherein said means rigidly securing said sleeves together comprises plate means providing a wall for each sleeve at said mutually contacting zone.

3. A bracket as defined in claim 2, including means, rigidly connected to said means securing said sleeves together, for attaching said bracket to a scaffold member.

4. A bracket as defined in claim 3, wherein said means for attaching said bracket to a scaffold member comprises four tabs extending beyond said sleeves including two tabs extending in opposite directions in general alignment with one of said through openings, and two tabs extending in opposite directions in general alignment with the other of said through openings, there being openings through said tabs permitting nails to be driven into scaffold members, whereby one of said tabs will extend vertically upward in any position of said bracket when connecting a vertical and a horizontal scaffold member.

5. The combination of a pair of wooden crossing members and a bracket set, the bracket set comprising an interconnecting bracket and an end bracket, said interconnecting bracket holding together said pair of crossing members and said end bracket supporting an end of one of said members, said interconnecting bracket comprising a central flat plate comprising at least one outwardly extending tab provided with openings therethrough for the purpose of receiving nails and a pair of channel configurated elements each having a web and parallel side flanges having their free ends secured to opposite sides of said flat plate, said channel configurated elements being mounted at right angles respectively to each other whereby the openings through said channel configurated elements extend perpendicular to each other for receiving said crossing members, said tab being generally aligned with one of said crossing members and extending beyond said sleeves, and there being openings through the webs of said channel configurated members to permit nails to be driven into said crossing members.

References Cited

UNITED STATES PATENTS

| | | | |
|---|---|---|---|
| 885,277 | 4/1908 | Davis | 287—20.94 |
| 2,317,125 | 4/1943 | Barnett | 287—20.95 |
| 2,610,460 | 9/1952 | Hendrickson | 287—51 |
| 2,874,708 | 2/1959 | Daus | 287—20.95 |
| 3,197,822 | 8/1965 | Herrschaft | 287—20.92 |

FOREIGN PATENTS 74,963   1/1961   France.

RAMON S. BRITTS, Primary Examiner

U.S. Cl. X.R.

248—228; 287—20.95, 51, 54